US012026262B2

(12) United States Patent
Matsubara et al.

(10) Patent No.: US 12,026,262 B2
(45) Date of Patent: Jul. 2, 2024

(54) STORAGE SYSTEM AND DATA DELETION METHOD

(71) Applicant: Hitachi, Ltd., Tokyo (JP)

(72) Inventors: Kazumasa Matsubara, Tokyo (JP); Mitsuo Hayasaka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 433 days.

(21) Appl. No.: 17/470,344

(22) Filed: Sep. 9, 2021

(65) Prior Publication Data

US 2022/0179970 A1 Jun. 9, 2022

(30) Foreign Application Priority Data

Dec. 9, 2020 (JP) ................................. 2020-204076

(51) Int. Cl.
*G06F 21/60* (2013.01)
*G06F 11/14* (2006.01)
*G06F 16/16* (2019.01)
*G06F 16/174* (2019.01)

(52) U.S. Cl.
CPC .......... *G06F 21/60* (2013.01); *G06F 11/1453* (2013.01); *G06F 16/162* (2019.01); *G06F 16/1748* (2019.01)

(58) Field of Classification Search
CPC .... G06F 21/60; G06F 11/1453; G06F 16/162; G06F 16/1748
See application file for complete search history.

(56) References Cited

U.S. PATENT DOCUMENTS

| | | | | |
|---|---|---|---|---|
| 8,335,768 | B1* | 12/2012 | Desai | G06F 11/1448 707/694 |
| 8,504,758 | B1* | 8/2013 | McHugh | G06F 12/1466 711/100 |
| 8,949,201 | B1* | 2/2015 | Batchu | G06F 21/62 707/692 |
| 9,047,312 | B1* | 6/2015 | Ten-Pow | G06F 16/162 |
| 9,053,124 | B1* | 6/2015 | Dornquast | G06F 21/552 |
| 9,135,266 | B1* | 9/2015 | Makin | G06F 16/1734 |
| 9,159,035 | B1* | 10/2015 | Ismael | G06F 9/45558 |
| 9,424,265 | B1* | 8/2016 | Sui | G06F 16/284 |
| 10,021,765 | B1* | 7/2018 | Elliot | H05B 47/175 |
| 10,324,807 | B1* | 6/2019 | Kumar | G06F 3/0665 |
| 10,324,893 | B1* | 6/2019 | Telang | G06F 11/14 |
| 10,445,183 | B1* | 10/2019 | Dobrean | G06F 11/1451 |
| 10,635,700 | B2 | 4/2020 | Arora et al. | |

(Continued)

*Primary Examiner* — Aravind K Moorthy
(74) *Attorney, Agent, or Firm* — Volpe Koenig

(57) ABSTRACT

Provided is a storage system capable of properly deleting derivative data stored at a plurality of sites.
A CPU executes a creation process of creating data based on data stored in a storage device at a local site and storing the created data in the storage device of a node at one of the plurality of sites. Further, the CPU collects, from each of the plurality of sites, history information created at each of the plurality of sites to indicate the history of each creation process. When deleting deletion-specified data, the CPU identifies deletion derivative data according to the history information created at each of the plurality of sites, and deletes the deletion-specified data and the deletion derivative data from the storage device at each of the plurality of sites. The deletion derivative data is derivative data derived from the deletion-specified data.

5 Claims, 19 Drawing Sheets

(56) References Cited

U.S. PATENT DOCUMENTS

| | | | |
|---|---|---|---|
| 10,725,965 B1* | 7/2020 | Rokicki | G06F 16/00 |
| 11,194,504 B2* | 12/2021 | Matsubara | G06F 3/0608 |
| 11,381,506 B1* | 7/2022 | Jindal | H04L 67/1004 |
| 11,481,399 B1* | 10/2022 | Juelich | G06F 16/162 |
| 11,483,158 B2* | 10/2022 | Nomura | G06F 11/1448 |
| 11,711,220 B1* | 7/2023 | Sanders | H04L 9/0838 |
| 2002/0198859 A1* | 12/2002 | Singer | G06F 16/972 |
| 2006/0288047 A1* | 12/2006 | Chron | G06F 16/162 |
| 2010/0100590 A1* | 4/2010 | Palay | G06Q 10/107 709/203 |
| 2010/0287619 A1* | 11/2010 | Chase | G06F 21/60 726/26 |
| 2010/0333116 A1* | 12/2010 | Prahlad | G06F 3/067 713/153 |
| 2011/0209196 A1* | 8/2011 | Kennedy | G06Q 30/02 726/1 |
| 2013/0090972 A1* | 4/2013 | Shin | G06Q 10/06313 705/7.23 |
| 2013/0325803 A1* | 12/2013 | Akirav | G06F 16/2246 707/634 |
| 2014/0181047 A1* | 6/2014 | Pawar | G06F 11/1451 707/654 |
| 2015/0339497 A1* | 11/2015 | Kurian | G06F 21/60 726/34 |
| 2016/0246967 A1* | 8/2016 | Gross | G06F 21/80 |
| 2016/0350794 A1* | 12/2016 | Amrany | G06Q 30/0222 |
| 2017/0116188 A1* | 4/2017 | Haustein | G06F 16/162 |
| 2018/0075043 A1* | 3/2018 | Hasegawa | G06F 21/6218 |
| 2018/0107561 A1* | 4/2018 | Bender | G06F 16/182 |
| 2019/0095455 A1* | 3/2019 | Barreto | G06F 11/1446 |
| 2019/0272103 A1* | 9/2019 | Namikoshi | G06F 11/1004 |
| 2019/0278665 A1* | 9/2019 | Raghuram | H04L 12/2803 |
| 2019/0278669 A1* | 9/2019 | Mueller-Wicke | G06F 16/176 |
| 2019/0289031 A1* | 9/2019 | Kozloski | H04L 63/145 |
| 2019/0391739 A1* | 12/2019 | Mueller | G06F 11/1451 |
| 2020/0241973 A1* | 7/2020 | Yadav | G06F 11/1453 |
| 2020/0250049 A1* | 8/2020 | Lee | G06F 11/1471 |
| 2020/0301792 A1* | 9/2020 | Takano | G06F 16/122 |
| 2020/0351347 A1* | 11/2020 | Chang | G06F 11/1458 |
| 2020/0374106 A1* | 11/2020 | Padmanabhan | H04L 63/105 |
| 2021/0240465 A1* | 8/2021 | Park | G06F 8/71 |
| 2021/0382865 A1* | 12/2021 | Matovinovic | G06Q 30/0185 |
| 2022/0083427 A1* | 3/2022 | Malamut | G06F 11/1464 |
| 2022/0131938 A1* | 4/2022 | Nobuhara | H04L 9/0643 |
| 2022/0138325 A1* | 5/2022 | Todd | G06F 21/54 726/26 |
| 2022/0342955 A1* | 10/2022 | Kobori | G06F 16/9027 |
| 2023/0067414 A1* | 3/2023 | Arifuku | G06F 3/1203 |
| 2023/0156132 A1* | 5/2023 | Tanaka | H04N 1/0097 358/1.13 |

\* cited by examiner

F I G . 3
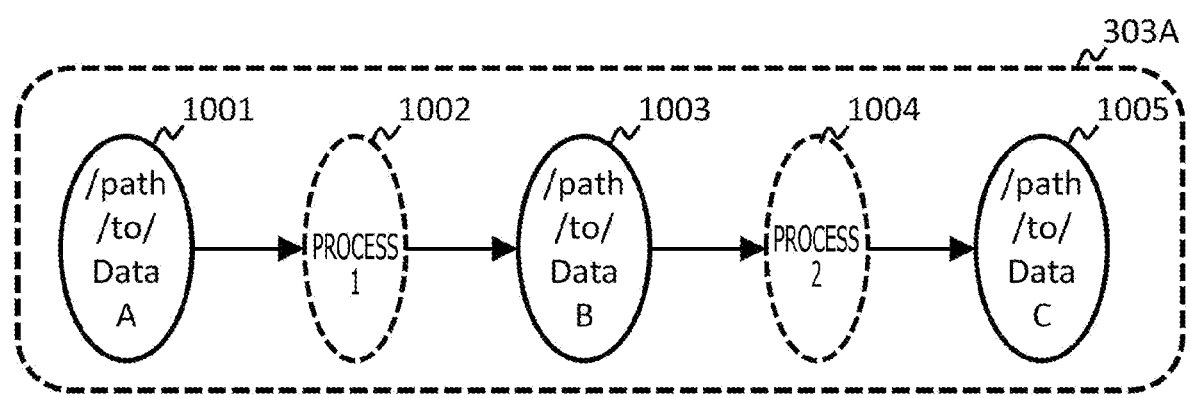

FIG.4

| Operation | From | | To | |
|---|---|---|---|---|
| | Site name | Path | Site name | Path |
| Replica | SITE A | /path/to/Data B | SITE N | /path/to/Data X |
| Copy | SITE A | /path/to/Data C | SITE B | /path/to/Data N |
| Other | SITE A | /path/to/Data C | SITE B | /path/to/Data M |

F I G . 5
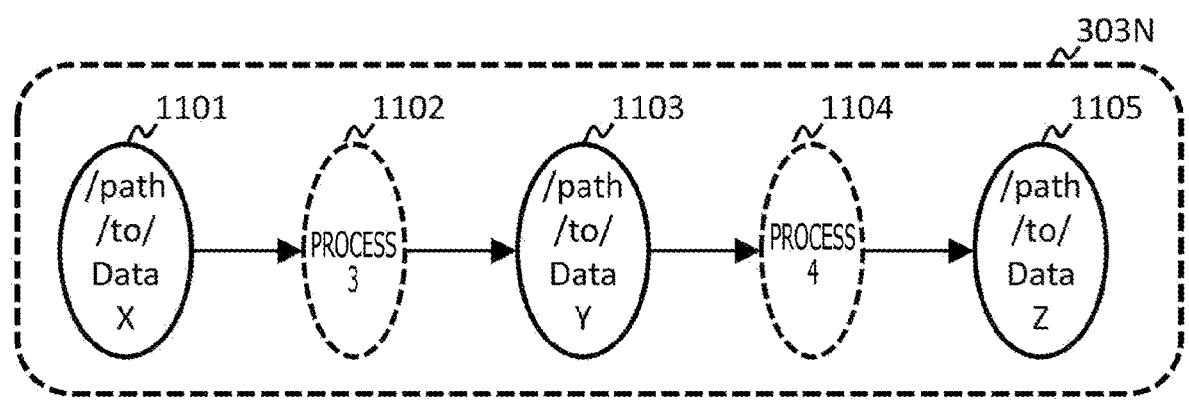

FIG. 6

| Operation | From | | To | | |
|---|---|---|---|---|---|
| | Site name | Path | Site name | Path | |
| Replica | SITE N | /path/to/Data Y | SITE X | /path/to/Data α | |

| Site name | DELETION TARGET DATA | | |
|---|---|---|---|
| SITE A | /path/to/Data B | /path/to/Data C | |
| SITE N | /path/to/Data X | /path/to/Data Y | /path/to/Data Z |
| SITE X | /path/to/Data α | | |
| SITE B | /path/to/Data N | /path/to/Data M | |

FIG.15

| Operation | DATE AND TIME | From | | | To | |
|---|---|---|---|---|---|---|
| | | Site name | Path | meta | Site name | Path |
| backup | 00:00:00, JANUARY 3, 2020 | SITE A | /path/to/ | offset table | SITE Z | /site0_path-to.backup20200103.tar.gz |

FIG.16

|  | File name | Offset | Len |
|---|---|---|---|
| 1 | Data A | aaa | lena |
| 2 | Data B | bbb | lenb |
| ... | ... | ... | ... |

| SITE | DELETION TARGET DATA | |
|---|---|---|
| SITE A | /path/to/Data B | /path/to/Data C |
| SITE Z | "Data B(Offcet: bbb, Length: lenb)" in /site0_path-to.backup20200103.tar.gz | |

STORAGE SYSTEM AND DATA DELETION METHOD

BACKGROUND OF THE INVENTION

1. Field of the Invention

The present disclosure relates to a storage system and a data deletion method.

2. Description of the Related Art

In a multicloud environment where data is distributed to a plurality of sites for storage purposes, on-premises clouds and various public clouds collaborate with each other to perform various information processes such as data analysis and data protection processes. In such information processes, data stored at various sites is, for example, copied, moved, deleted, and processed.

Further, in recent years, regulations regarding data protection, which are represented by the general data protection regulation (GDPR), have been strengthened. Therefore, it is important to avoid data leakage. Consequently, when deleting specified data, it is necessary to guarantee not only the deletion of the specified data but also the deletion of derivative data derived from the specified data.

A technology disclosed in U.S. patent Publication Ser. No. 15/943,603 presents history information indicating a derivative relation between data stored at each storage site. This makes it possible to grasp the derivative relation between the data. As a result, the derivative data can be deleted on the basis of the grasped derivative relation.

SUMMARY OF THE INVENTION

However, in the multicloud environment, data is, for example, copied between different sites. The technology described in U.S. patent Publication Ser. No. 15/943,603 is able to grasp the derivative relation between data stored at each site, but unable to grasp the derivative relation between data stored at different sites. Therefore, the technology described in U.S. patent Publication Ser. No. 15/943,603 has a problem in that it cannot easily achieve proper deletion of the derivative data.

The present disclosure has been made in view of the above circumstances, and provides a storage system and a data deletion method that are able to properly delete derivative data stored at a plurality of sites.

According to an aspect of the present disclosure, there is provided a storage system including a plurality of nodes distributed to a plurality of sites. Each site has a node including a control section, and a storage section for storing data. The control section creates data based on data stored in the storage section, performs a creation process for storing the created data in the storage section of the node at one of the plurality of sites, creates, for each site, history information indicating the history of each creation process performed at each site, and collects the history information from each site. When deleting deletion-specified data, the control section identifies deletion derivative data according to the history information created at each site, and deletes the deletion-specified data and the deletion derivative data from the storage section at each site. The deletion derivative data is derivative data derived from the deletion-specified data.

The present invention makes it possible to properly delete derivative data stored at a plurality of sites.

BRIEF DESCRIPTION OF THE DRAWINGS

FIG. 3 is a diagram illustrating an example of data history information;

FIG. 4 is a diagram illustrating an example of an operation log;

FIG. 5 is a diagram illustrating another example of the data history information;

FIG. 6 is a diagram illustrating another example of the operation log;

FIG. 11 is a diagram illustrating an example of a deletion list;

FIG. 15 is a diagram illustrating another example of the operation log;

FIG. 16 is a diagram illustrating an example of an offset table;

FIG. 18 is a diagram illustrating another example of the deletion list; and

DESCRIPTION OF THE PREFERRED EMBODIMENTS

Embodiments of the present disclosure will now be described with reference to the accompanying drawings. It should be noted that the embodiments described below do not limit the invention defined in the appended claims, and that all components and all combinations of the components are not always essential to solutions provided by the invention.

Further, in some cases, the following description deals with a process by regarding a "program" as a subject performing the process. However, when executed by a processor (e.g., a central processing unit (CPU)), the program performs a predetermined process by appropriately using memory resources (e.g., memories) and/or communication interface devices (e.g., ports). Therefore, the processor may be regarded as a subject performing the process.

First Embodiment

Figure 1:
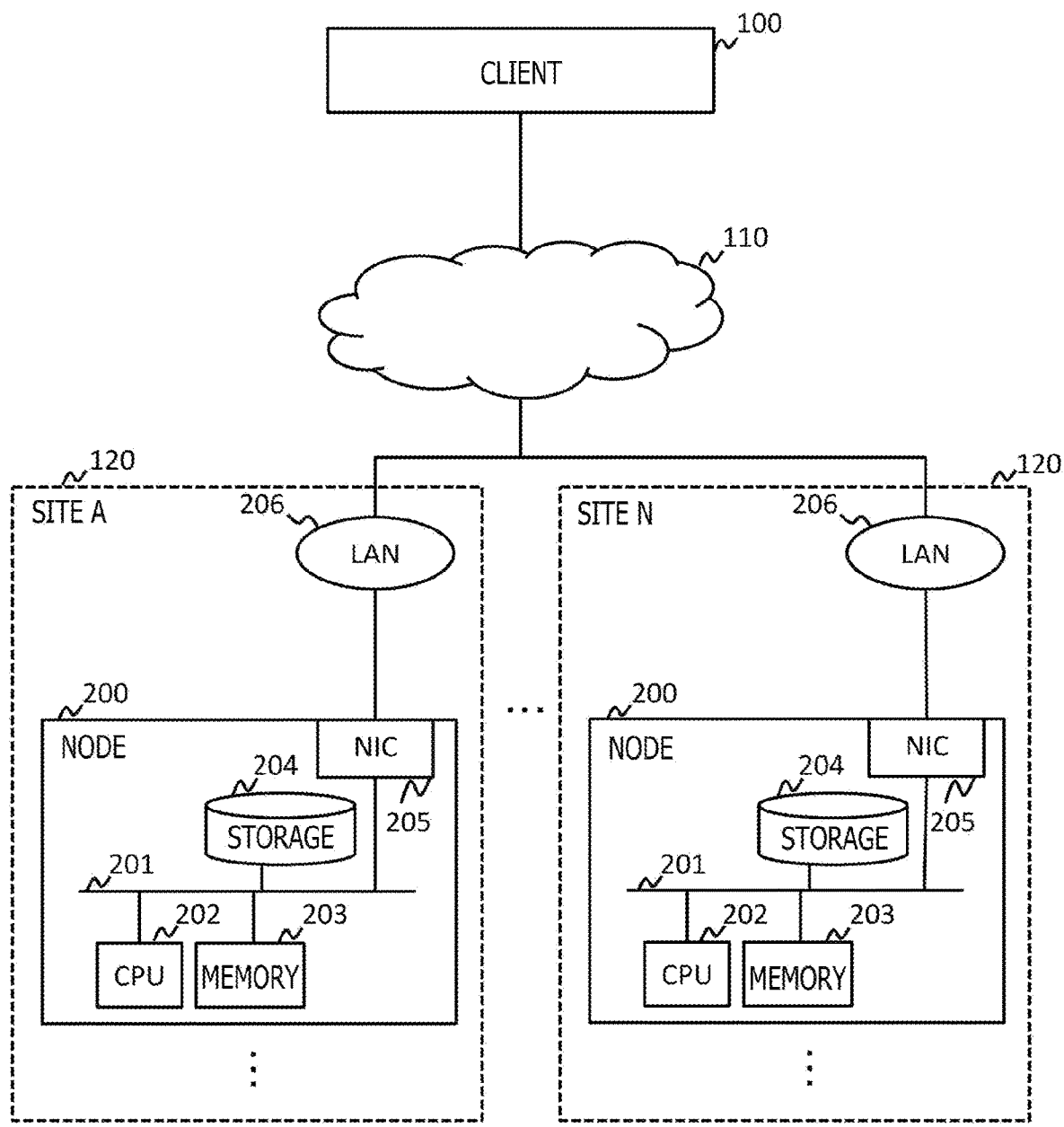
FIG. 1 is a diagram illustrating a hardware configuration of an information processing system.

FIG. 1 is a diagram illustrating a hardware configuration of an information processing system according to a first embodiment of the present disclosure. The information processing system depicted in FIG. 1 includes a client 100 and a plurality of sites 120. The client 100 and each site 120 are interconnected through a network 110.

A storage system for storing data is formed at each site 120. Although FIG. 1 depicts two sites 120, the number of sites 120 is not limited to two. The information processing system may include two or more sites 120. In a case where the individual sites 120 need to be distinguished from each other, they may be hereinafter referred to as, for example, site A, site B, . . . , site N, . . . , site X, . . . , and site Z. In FIG. 1, site A and site N are depicted as the sites 120.

The client 100 is a terminal device that instructs the storage system, which is formed by the sites 120, to perform various processes such as data write, data read, and data deletion processes.

The sites 120 each include a node 200 which is an information processing device that performs various processes. Although FIG. 1 depicts one node 200 for each site 120, the sites 120 may each include a plurality of nodes 200. In a case where a plurality of nodes 200 exist at one site 120, the nodes 200 may have the same functions or different functions. The roles of the nodes 200 may be different from each other so that, for example, one node 200 functions as a storage node used exclusively for data management (storage) while another node 200 functions as a compute node used exclusively for data processing.

The node 200 includes a CPU 202, a memory 203, a storage device 204 (depicted as a storage in FIG. 1), and a network interface card (NIC) 205. These parts 202 to 205 are interconnected through a bus 201.

The CPU 202 is a processor that reads programs memorized in the memory 203 and implements various functions by executing the read programs. The CPU 202 functions as a control section for controlling the node 200. The memory 203 is a primary memory device that stores the programs defining the operation of the CPU 202 and various information used by the CPU 202. The storage device 204 is a secondary memory device (storage device) that stores data.

The NIC 205 is a communication section that communicates with the client 100 and with another node 200. In the example of FIG. 1, the NIC 205 communicates with the client 100 and a node 200 at a remote site 120 through a LAN 206 and the network 110, and communicates with another node 200 at the same site 120 through the LAN 206. It should be noted that the LAN 206 is used as a hub for connecting the nodes 200 at the same site 120. Therefore, the LAN 206 may be omitted in a case where the site 120 includes one node 200.

Figure 2:
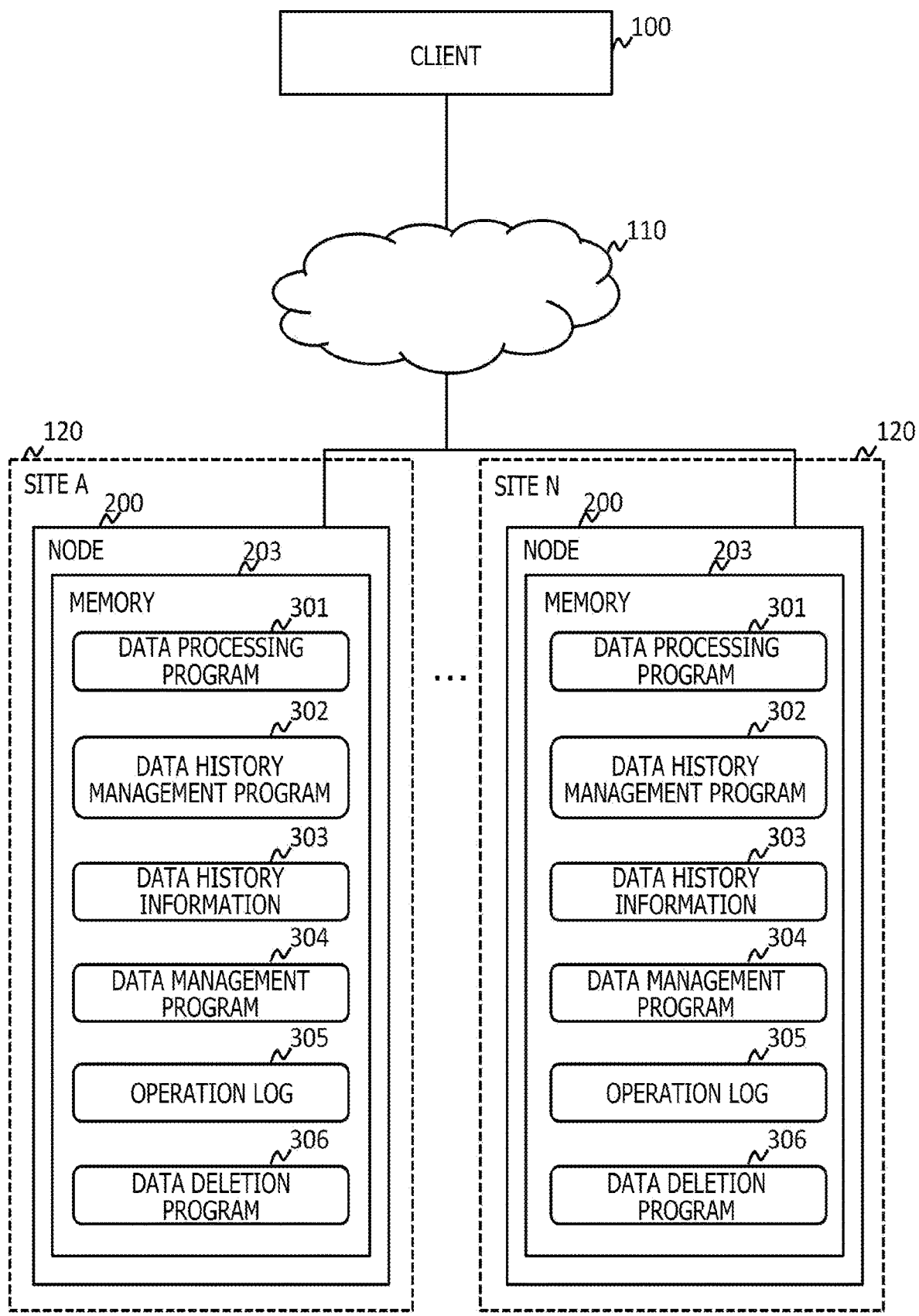
FIG. 2 is a diagram illustrating a logical configuration of the information processing system.

FIG. 2 is a diagram illustrating a logical configuration of the information processing system according to the first embodiment of the present disclosure. As depicted in FIG. 2, the memory 203 of the node 200 at each site 120 memorizes a data processing program 301, a data history management program 302, data history information 303, a data management program 304, an operation log 305, and a data deletion program 306.

The data processing program 301 is a program that performs data processing on data stored in the storage device 204. In the present embodiment, the data processing is a process for creating processed data by processing the data. The contents of the processed data may be the same as those of original data. The data processing is performed, for example, at periodic time points or at a time point specified by the client 100 for data processing purposes.

The data history management program 302 is a program that manages the history of data processing performed by the data processing program 301, and creates the data history information 303 indicating the history of data processing. The history of data processing includes the correspondence between the original data used for each data processing operation and the processed data created by each data processing operation. Therefore, the data history information 303 may be regarded as indicating the history of data.

The data management program 304 is a program that manages data to be stored in the storage device 204. The data management program 304 stores, in the storage device 204, for example, data specified for write by the client 100 and processed data created by data processing performed by the data processing program 301. Further, the data management program 304 performs an operation (operation processing) so that duplicate data identical to data stored in the storage device 204 at the local site 120 is stored in the storage device 204 at a remote site 120, and then creates the operation log 305 indicating the history of such an operation.

The above operation, which is, for example, a protection process for protecting data, includes not only a copy operation that is performed by the data management program 304 in accordance with an instruction from the client 100, but also a replica operation and a backup operation that are performed independently by the data management program 304 at a predetermined time point. The copy operation and the replica operation are processes performed so that data duplicated from operation source data targeted for operation is stored as is at a remote site 120. The backup operation is a process performed so that a backup file, namely, an archive file containing data duplicated from one or more sets of operation source data, is stored at a remote site 120. The backup file may be a compressed file. Further, the backup operation may be performed on one or more sets of data included in a directory in a specified backup target path. The above-mentioned operation may include an additional process other than those mentioned in the above examples (this additional process is hereinafter referred to as the other operation).

The data processing performed by the data processing program 301 and the operation performed by the data management program 304, which are described above, are included in the creation process of creating data based on data stored in the storage device 204 and storing the created data in the storage device 204 of one of the nodes 200 at the sites 120. Further, the data history information 303 and the operation log 305 are included in the history information regarding the creation process. It should be noted in the present embodiment that the data history information 303 and the operation log 305 are created for each site.

The data deletion program 306 is a program that, according to a data deletion instruction from the client 100, deletes data stored in the storage device 204. In the present embodiment, the data deletion instruction is either a simple deletion instruction or a derivative deletion instruction. The simple deletion instruction is an instruction for deleting only deletion-specified data, which is specified data. The derivative deletion instruction is an instruction for deleting not only the deletion-specified data but also deletion derivative data. The deletion derivative data is derivative data derived from the deletion-specified data. It should be noted that the derivative data derived from data denotes data created by one or more creation processes performed on the original data.

In a case where the derivative deletion instruction is issued as the data deletion instruction, the data deletion program 306 creates global data history information by collecting the data history information 303 and the operation log 305 from each site 120, and combining the collected sets of the data history information 303, according to the collected data history information 303 and operation log 305. The global data history information indicates a derivative relation between data stored in the storage system. Then, on the basis of the global data history information, the data deletion program 306 deletes not only the deletion-specified data but also the deletion derivative data, which is derived from the deletion-specified data and is stored in the storage device 204 at each site 120.

It should be noted that the data history information 303 and the operation log 305 may be persistently stored, for example, in the storage device 204.

FIG. 3 is a diagram illustrating an example of data history information 303A, which is the data history information 303 stored at site A. In the example of FIG. 3, the data history information 303A is depicted as a visual graph.

The data history information 303A indicates the history of data processing performed to create data 1001 to 1005. More specifically, the data history information 303A indicates that data process 1002 has been performed to create data 1003 from data 1001, and that data process 1004 has been performed to create data 1005 from data 1003. In this case, data 1003 and 1005 are derivative data derived from data 1001. Further, the data history information 303A includes path information, which is meta-information indicating the storage destination of data 1001, 1003, and 1005. It should be noted that the data history information 303A may include other meta-information indicating, for example, the execution date and time of data processes 1002 and 1004 and the date and time of the storage of data 1001, 1003, and 1005.

FIG. 4 is a diagram illustrating an example of an operation log 305A, which is the operation log 305 stored at site A.

The operation log 305A depicted in FIG. 4 includes fields 1011 to 1013. Field 1011 stores an operation name indicating an executed operation. Field 1012 stores operation source information regarding operation source data. Field 1013 stores operation destination information regarding operation destination data, which is duplicate data created by an operation.

Field 1012, more specifically, includes fields 1012a and 1012b. Field 1012a stores a source site name that is the site name indicating a site 120 where the operation source data is stored. Field 1012b stores source path information that is path information indicating the storage destination within the site 120 where the operation source data is stored.

Field 1013, more specifically, includes fields 1013a and 1013b. Field 1013a stores a destination site name that is the site name indicating a site 120 where the operation destination data is stored. Field 1013b stores destination path information that is path information indicating the storage destination in the site 120 where the operation destination data is stored.

FIG. 5 is a diagram illustrating another example of the data history information 303, or more specifically, an example of data history information 303N, which is the data history information 303 stored at site N. In the example of FIG. 5, the data history information 303N is depicted as a visual graph.

The data history information 303N indicates the processing history of creation of data 1105 from data 1101. More specifically, the data history information 303N indicates that data process 1102 has been performed to create data 1103 from data 1101, and that data process 1104 has been performed to create data 1105 from data 1103. Further, the data history information 303N includes path information indicating the storage destination of data 1101, 1103, and 1105.

FIG. 6 is a diagram illustrating another example of the operation log 305, or more specifically, an example of an operation log 305N, which is the operation log 305 stored at site N.

As is the case with the operation log 305A depicted in FIG. 4, the operation log 305N depicted in FIG. 6 includes fields 1001 to 1013. More specifically, the operation log 305N depicted in FIG. 6 differs from the operation log 305A in the contents of information, which is stored in fields 1011 to 1013, but has the same structure as the operation log 305A.

It should be noted that, although not depicted in FIG. 6, the information stored in the operation log 305N at all sites 120 has the same configuration as the data history information 303 and the operation log 305 depicted in FIGS. 3 to 6.

Figure 7:
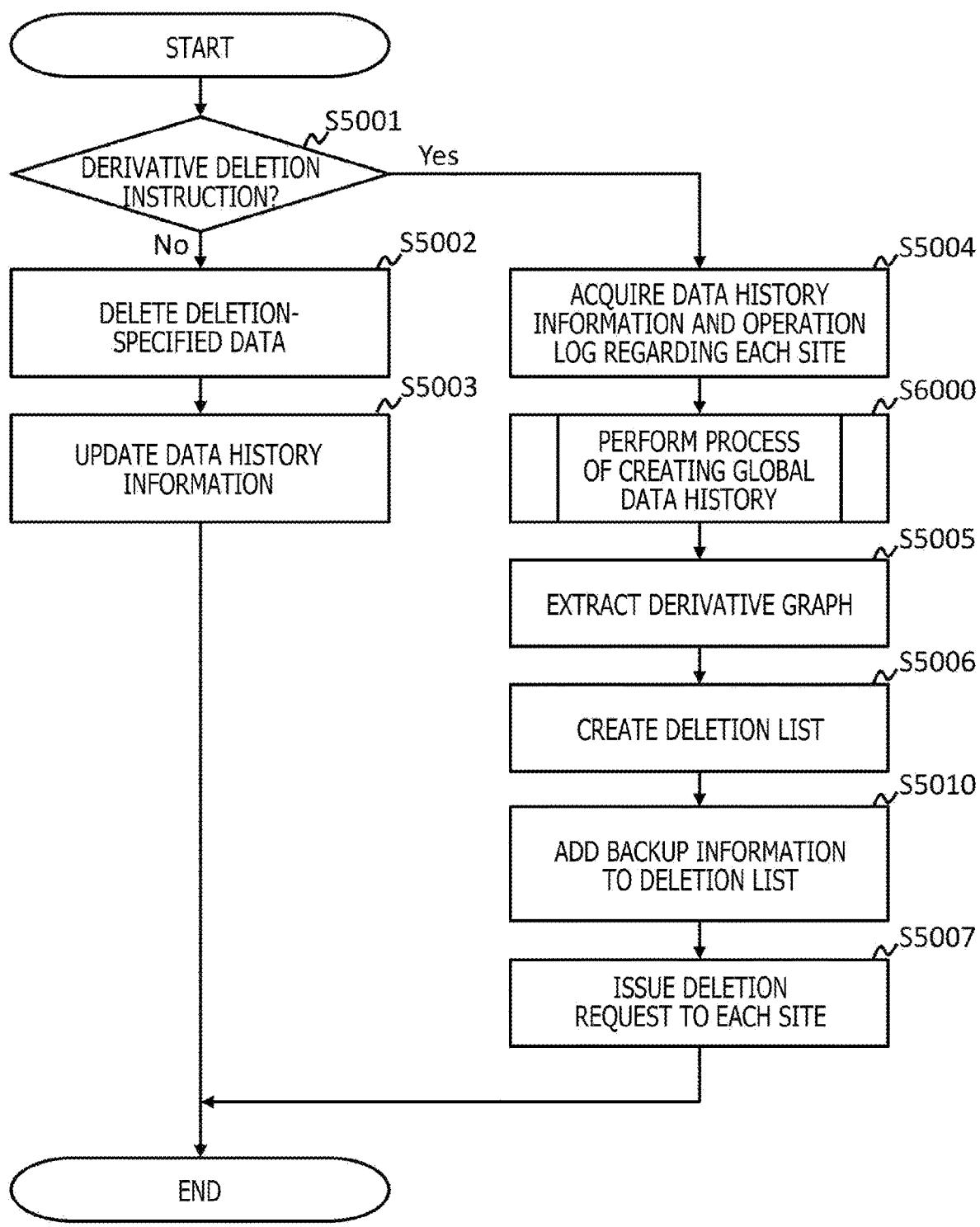
FIG. 7 is a flowchart illustrating an example of a data deletion process.

FIG. 7 is a flowchart illustrating an example of a data deletion process performed by the data deletion program 306. The data deletion process starts when the data deletion program 306 receives the data deletion instruction from the client 100.

First of all, the data deletion process determines whether the received data deletion instruction is the simple deletion instruction or the derivative deletion instruction (step S5001).

If the data deletion instruction is not the derivative deletion instruction ("NO" at step S5001), the data deletion program 306 requests the data management program 304 to delete deletion-specified data specified by the data deletion instruction. According to such a request, the data management program 304 deletes the deletion-specified data from the storage device 204 (step S5002). The data deletion program 306 requests the data history management program 302 to update the data history information 303 so as to indicate that the deletion-specified data is now deleted. According to such a request, the data history management program 302 updates the data history information 303 so as to indicate that the deletion-specified data is deleted (step S5003). Upon completion of step S5003, the data deletion process terminates.

Meanwhile, if the data deletion instruction is the derivative deletion instruction ("YES" at step S5001), the data deletion program 306 transmits, to each site 120, an acquisition request for acquiring the data history information 303 and the operation log 305, and thus acquires the data history information 303 and the operation log 305 from each site 120 (step S5004). When, for example, the data deletion program 306 of the node 200 receives the acquisition request, each site 120 acquires the data history information 303 and the operation log 305 from the memory 203, according to the acquisition request, and returns the acquired data history information 303 and operation log 305 to a sender of the acquisition request.

On the basis of the acquired data history information 303 and operation log 305 regarding each site 120, the data deletion program 306 executes a creation process (see FIG. 9) of creating the global data history information (see FIG. 8) indicative of the derivative relation between data stored in the whole storage system (step S6000).

On the basis of the global data history information, the data deletion program 306 creates a derivative graph (step S5005). The derivative graph indicates the deletion-specified data and the deletion derivative data. The deletion derivative data is derived from the deletion-specified data.

The data deletion program 306 regards, as deletion target data, the deletion-specified data and deletion derivative data indicated by the derivative graph, and creates a deletion list (step S5006). The deletion list indicates the deletion target data at each site 120.

The data deletion program 306 determines whether backup data is included in the deletion list. The backup data is data created by the backup operation. If the backup data is included in the deletion list, the data deletion program 306 adds position information to the deletion list, according to the operation log 305 regarding the backup operation (step S5010). The position information indicates the position of the deletion derivative data in the backup data. It should be noted that the position information will be described in more detail in conjunction with a second embodiment of the present disclosure.

The data deletion program 306 transmits a deletion request to each site 120 in order to delete the deletion target data stored in the storage device 204 at each site 120 (step S5007). The deletion request is a request for deleting the deletion target data indicated by the deletion list. Upon completion of step S5007, the data deletion process terminates. In the present embodiment, the deletion request includes the deletion list, and a deletion execution process is performed (see FIG. 12). The deletion execution process is performed to identify the deletion target data stored at a site 120 that has received the deletion request, and delete the identified deletion target data from the deletion list. Further, the deletion request need not be transmitted to the local site, and the data deletion program 306 deletes, according to the deletion list, the deletion target data stored at the local site.

Figure 8:
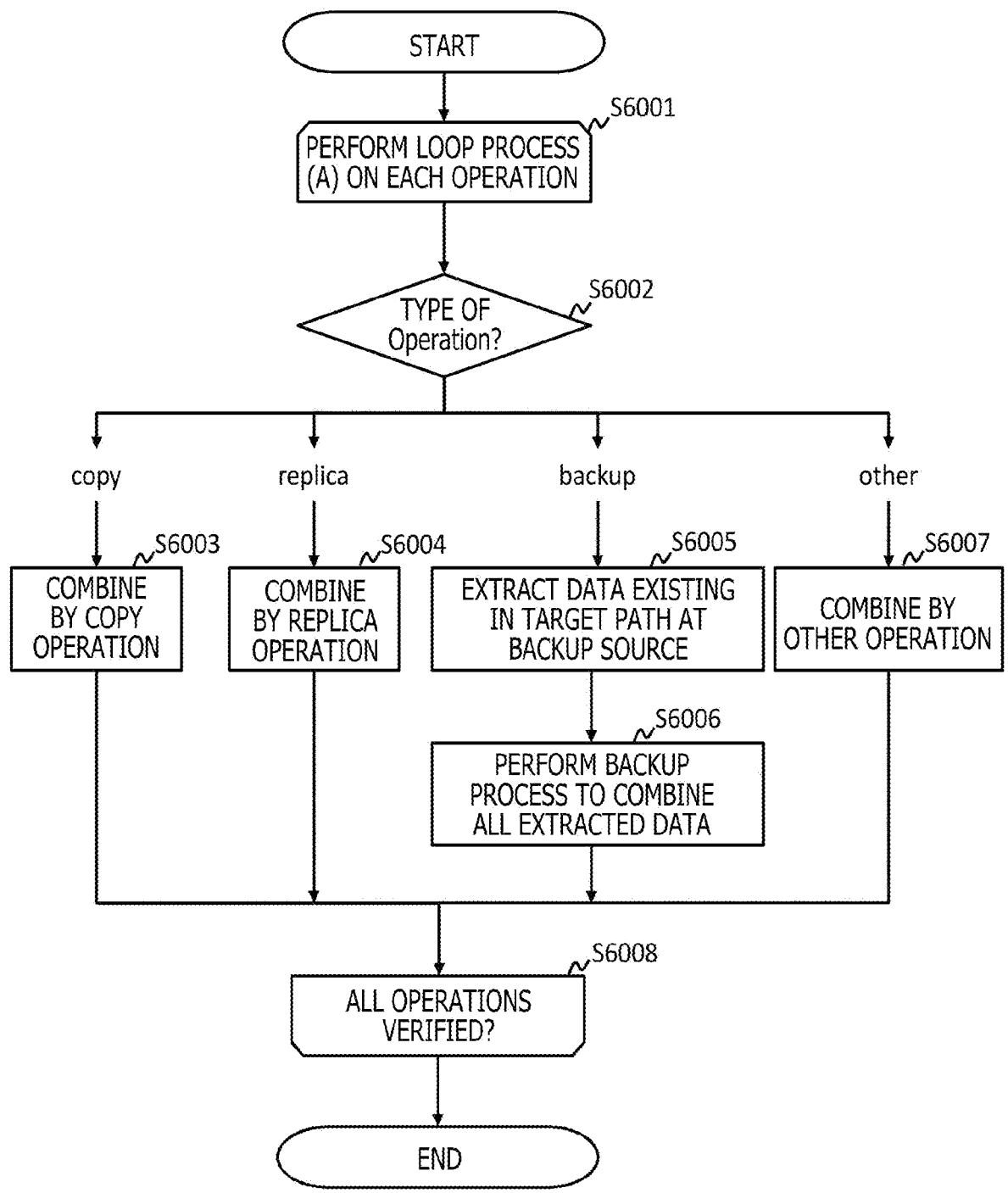
FIG. 8 is a flowchart illustrating an example of a process of creating global data history information.

FIG. 8 is a flowchart illustrating an example of a creation process that is performed in step S6000 of FIG. 7 in order to create the global data history information.

In the creation process of creating the global data history information, the data deletion program 306 executes loop process (A) to repeatedly perform steps S6002 to S6006 for each operation indicated by the operation log 305 of each site 120 (step S6001).

In loop process (A), first of all, the data deletion program 306 identifies the type of a target operation, according to the operation log 305 (step S6002).

In a case where the type of the target operation is the copy operation ("copy" at step S6002), the data deletion program 306 performs the copy operation, according to the operation log 305, to combine the operation source data (copy source data) in the data history information 303 regarding an operation source site with the operation destination data (copy destination data) in the data history information 303 regarding an operation destination site (step S6003).

In a case where the type of the target operation is the replica operation ("replica" at step S6002), the data deletion program 306 performs the replica operation, according to the operation log 305, to combine the operation source data (replica source data) in the data history information 303 regarding the operation source site with the operation destination data (replica destination data) in the data history information 303 regarding the operation destination site (step S6003).

In a case where the type of the target operation is the backup operation ("backup" at step S6002), the data deletion program 306 identifies, as backup operation source data, data included in a directory in the backup target path and existing at the date and time of execution of the backup operation (step S6005). The data deletion program 306 then performs the backup operation to combine each set of backup operation source data and place the combined backup operation source data in the backup file at a backup operation destination (step S6006). It should be noted that processing performed in steps S6005 and S6006 will be described in more detail in conjunction with the second embodiment.

In a case where the type of the target operation is other than those mentioned above, that is, the other operation ("other" at step S6002), the data deletion program 306 performs the other operation, according to the operation log, to combine the operation source data in the data history information 303 regarding the operation source site with the operation destination data in the data history information 303 regarding the operation destination site (step S6006).

Upon completion of processing in step S6003, S6004, S6006, or S6007, the data deletion program 306 determines whether processing in steps S6002 to S6006 is completed for all operations. In a case where the processing in steps S6002 to S6006 is completed for all operations, the data deletion program 306 exits loop process (A) (step S6008). Upon completion of step S6008, the creation process terminates.

Figure 9:
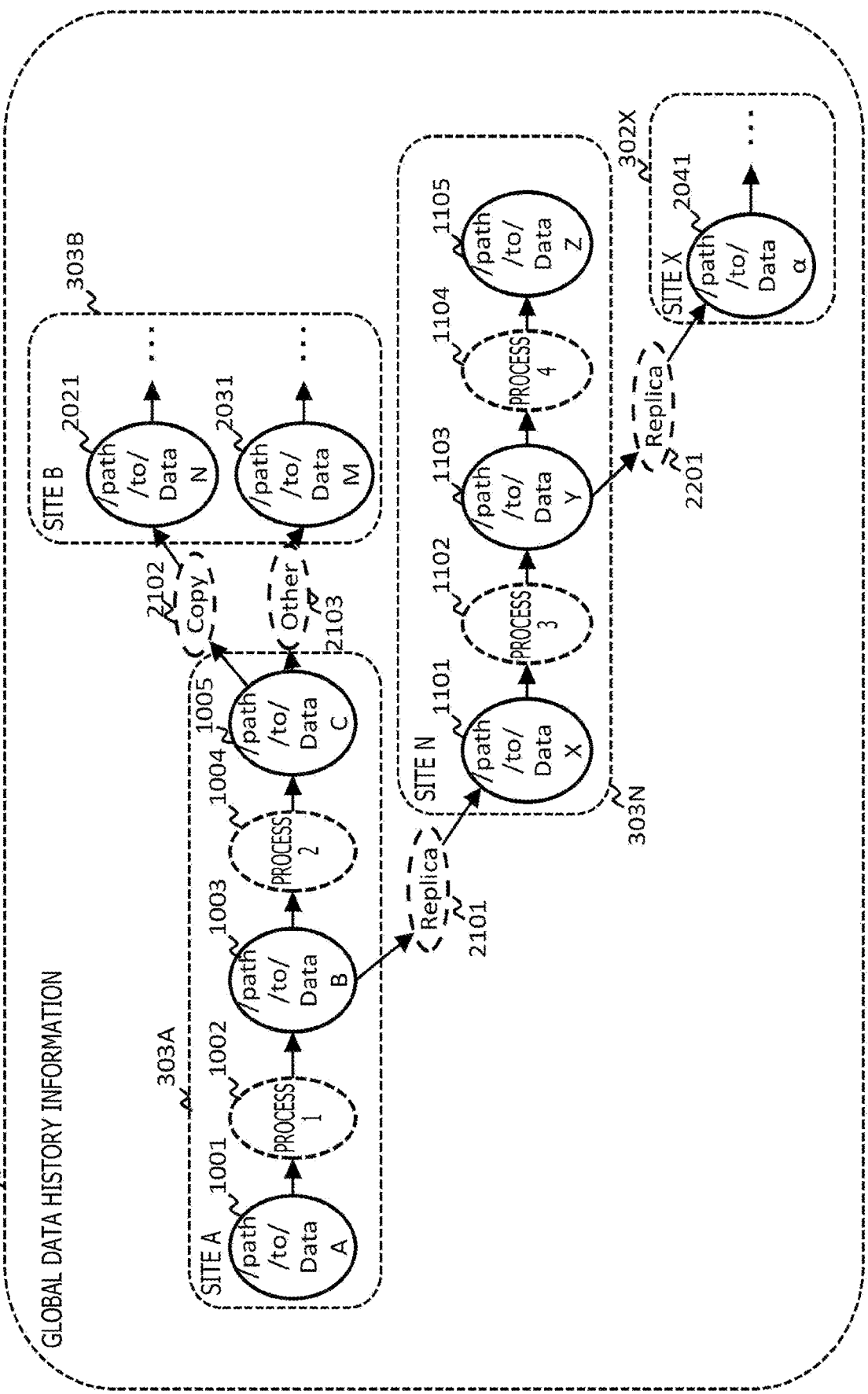
FIG. 9 is a diagram illustrating an example of the global data history information.

FIG. 9 is a diagram illustrating an example of the global data history information that is created in step S5005 in FIG. 7 (steps S6001 to S6008 in FIG. 8).

The global data history information 2000 depicted in FIG. 9 is information obtained by combining the data history information 303A regarding site A, the data history information 303N regarding site N, the data history information 303B regarding site B, and the data history information 303X regarding site X through the use of the operation log 305 of each site.

More specifically, the global data history information 2000 includes the data history information 303A, 303B, 303N, and 303X, and additionally includes operation information indicating the correspondence between sets of data acting as operation source data and operation destination data for operations on such data history information. In the example of FIG. 9, the operation information indicates the correspondence between data 1003 in the data history information 303A regarding site A and data 1101 at site N due to the replica operation 2101, the correspondence between data 1005 in the data history information 303A regarding site A and data 2021 at site B due to the copy operation 2102, the correspondence between data 1005 in the data history information 303A regarding site A and data 2031 at site N due to the other operation 2103, and the correspondence between data 1103 in the data history information 303N regarding site N and data 2041 at site X due to the replica operation 2201.

Figure 10:
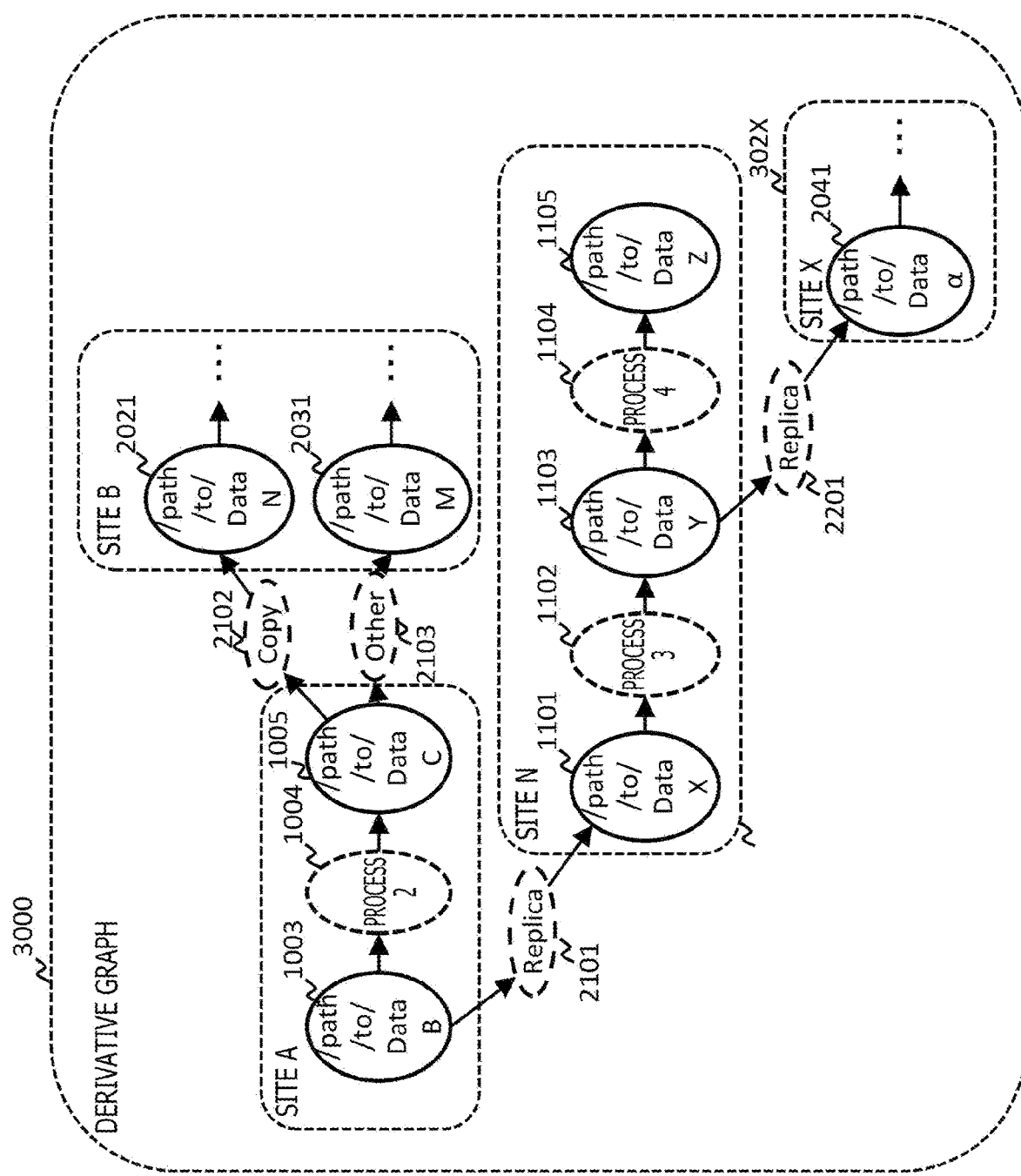
FIG. 10 is a diagram illustrating an example of a derivative graph.

FIG. 10 is a diagram illustrating an example of the derivative graph that is created in step S5006 of FIG. 7. The derivative graph depicted in FIG. 10 is an example of the derivative graph that is created in a case where the derivative deletion instruction for designating data 1003 as the deletion-specified data is received by the data deletion program 306 at site A. The derivative graph 3000 depicted in FIG. 10 represents information that is obtained by extracting data 1003 and derivative data derived from data 1003 from the global data history information 2000 depicted in FIG. 9.

FIG. 11 is a diagram illustrating an example of the deletion list that is created in step S5006 of FIG. 7. The deletion list 4000 depicted in FIG. 11 is a deletion list created from a derivative graph 3000 depicted in FIG. 10 and includes fields 4001 and 4002. Field 4001 stores a site name indicating a site 120 where the deletion target data is stored. Field 4002 stores path information indicating a storage destination where the deletion target data in the site 120 is stored.

Figure 12:
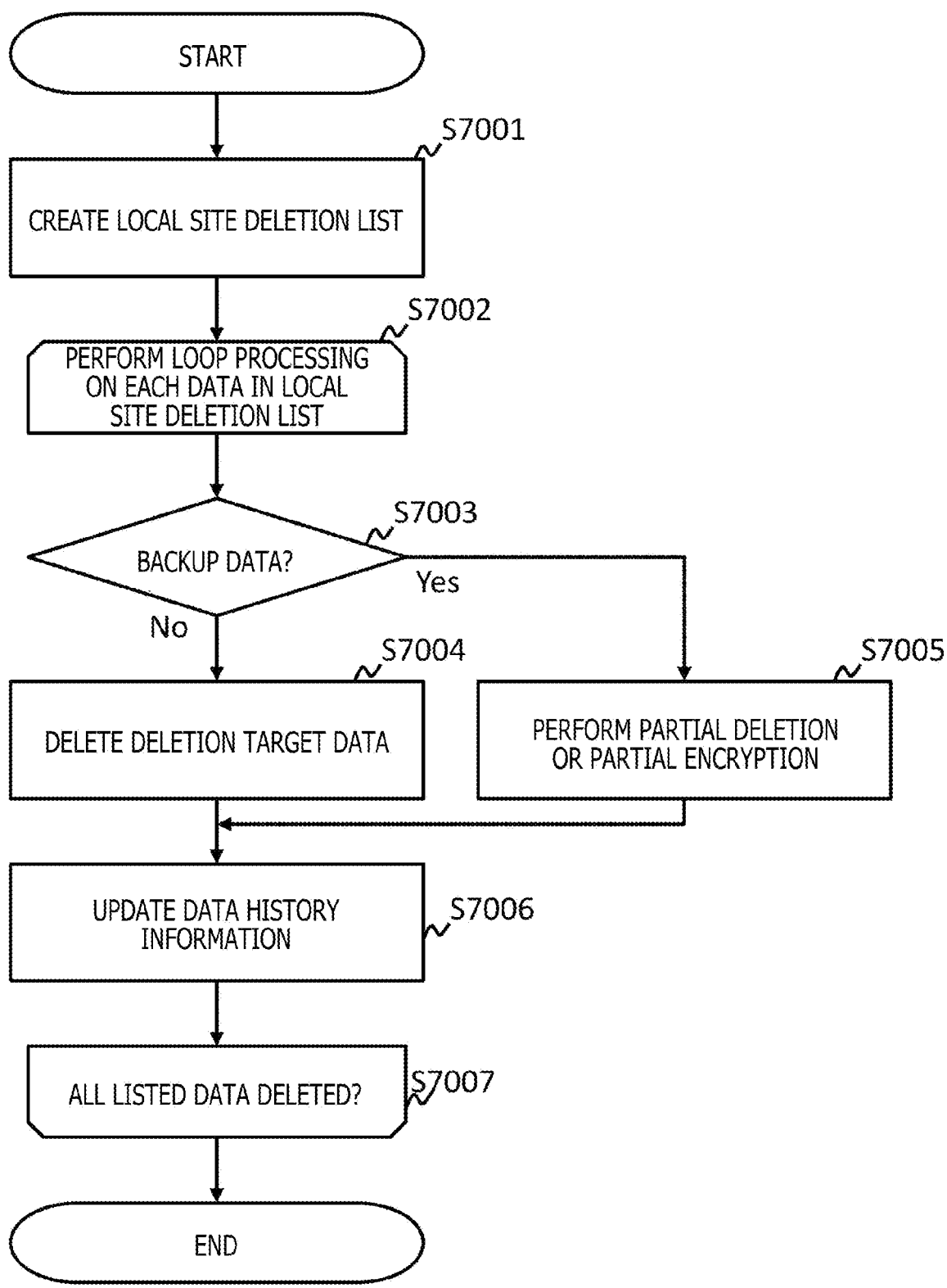
FIG. 12 is a flowchart illustrating an example of a deletion execution process.

FIG. 12 is a flowchart illustrating an example of the deletion execution process that is performed by the data deletion program 306 at a site 120 where the deletion request transmitted in step S5007 of FIG. 7 is received.

First of all, on the basis of a deletion list 4000 included in the received deletion request, the data deletion program 306 creates, as a local site deletion list, a list of the deletion target data stored at the local site 120 (step S7001).

The data deletion program 306 executes loop process (B) to repeatedly perform steps S7003 to S7006 for each set of deletion target data included in the local site deletion list (step S7002).

In loop process (B), the data deletion program 306 determines whether the relevant deletion target data is backup data obtained by the backup operation (step S7003).

In a case where the relevant deletion target data is not the backup data ("No" at step S7003), the data deletion program 306 instructs the data management program 304 to delete the deletion target data so as to delete the deletion target data from the storage device 204 (step S704). Meanwhile, in a case where the relevant deletion target data is the backup data ("Yes" at step S7003), the data deletion program 306 deletes the deletion target data by partially deleting or partially encrypting a portion of the backup file that corresponds to the deletion target data (step S7005). Partial deletion and partial encryption will be described in more detail in conjunction with the second embodiment.

Upon completion of step S7004 or S7005, the data deletion program 306 requests the data history management program 302 to update the data history information 303 so as to indicate that the deletion target data is now deleted. According to such a request, the data history management program 302 updates the data history information 303 so as to indicate that the deletion target data is deleted (step S7006).

Subsequently, the data deletion program 306 determines whether processing in steps S7003 to S7006 is completed for all the deletion target data included in the local site deletion list. In a case where the processing in steps S7003 to S7006 is completed for all the deletion target data, the data deletion program 306 exits loop process (B) (step S7007). Upon completion of step S7007, the deletion execution process terminates.

Figure 13:
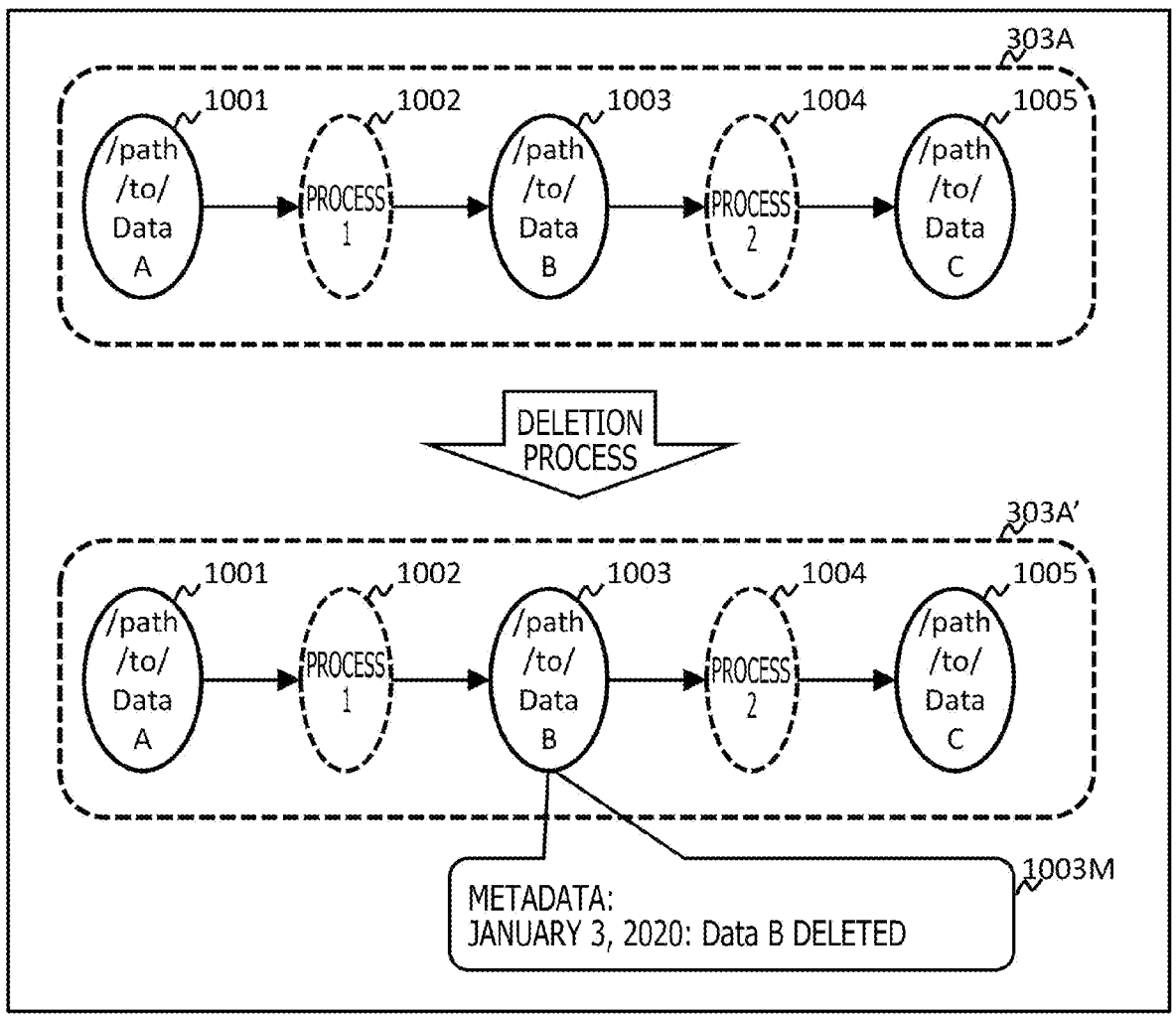
FIG. 13 is a diagram illustrating an example of a history update process.

FIG. 13 is a diagram illustrating an example of a history update process that is performed to update the data history information 303 in step S5003 of FIG. 7 and in step S7006 of FIG. 12.

In the example of FIG. 13, the data history information 303A is updated to data history information 303A'. The data history information 303A' indicates that the deletion target data is deleted by the data deletion process. In the data history information 303A', metadata 1003M is added to data 1003, which is the deletion target data, to indicate that data 1003 is already deleted. The metadata 1003M may indicate the date and time of deletion of data 1003 and the reason for deletion. For example, as depicted in FIG. 13, the metadata 1003M may indicate that "Jan. 3, 2020: DELETED BECAUSE DATA WAS DERIVED FROM DATA A."

As described above, in the present embodiment, the data deletion program 306 executes the creation process of creating data based on data stored in the storage device 204 at the local site 120 and storing the created data in the storage device 204 of one of the nodes 200 at the plurality of sites 120. Further, the data deletion program 306 collects, from each site, the history information that is created at each site and indicative of the history of each creation process. When deleting the deletion-specified data, the data deletion program 306 identifies the deletion derivative data, which is derivative data derived from the deletion-specified data, according to the history information created at each site 120, and deletes the deletion-specified data and the deletion derivative data from the storage device 204 at each site 120. Therefore, the deletion-specified data and the deletion derivative data derived from the deletion-specified data are both deleted from the storage device 204 at each site 120. As a result, the derivative data stored at the plurality of sites can be properly deleted.

Further, in a case where the deletion derivative data is stored at a remote site, the present embodiment deletes the deletion derivative data by requesting the nodes 200 at the remote site to delete the deletion derivative data. Therefore, the deletion derivative data stored at each site can be properly deleted from each site.

Furthermore, the present embodiment creates global history information indicating the derivative relation between data stored in the storage system, according to the history information regarding the creation process that is collected from each site, and identifies the deletion derivative data, according to the created global history information. Therefore, the derivative relation between all sets of data can be grasped. As a result, the derivative data can be properly deleted.

Moreover, the creation process in the present embodiment includes a data process of storing, at the local site 120, processed data obtained by processing original data, and an operation of storing duplicate data identical with the original data at a remote site. Therefore, the derivative data can be properly deleted even in a case where, for example, copy, replication, backup, and other data protection functions are provided and performed between the sites.

Second Embodiment

In conjunction with the second embodiment, a case where the backup operation is performed will now be described in more detail.

Figure 14:
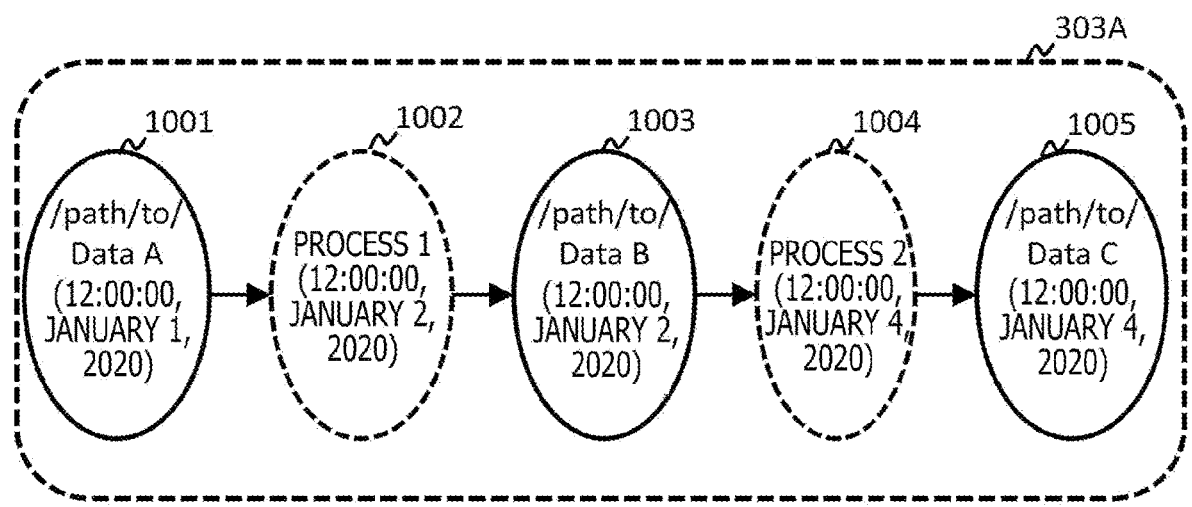
FIG. 14 is a diagram illustrating another example of the data history information.

FIG. 14 is a diagram illustrating a more detailed example of the data history information. The data history information 303A depicted in FIG. 14 is configured such that date and time information is added to each of elements 1001 to 1005 in the data history information 303A depicted in FIG. 5. The date and time information indicates, for example, the date and time of data creation, the date and time of data deletion, and the date and time of data process execution.

FIG. 15 is a diagram illustrating an example of the operation log including the information regarding the backup operation. The operation log 305A depicted in FIG. 15 deals with an example where a backup file obtained by compressing all data included in a directory in a backup target path "/path/to" at site A is stored at site Z.

In contrast to the operation logs 305A and 305N depicted in FIGS. 4 and 6, the operation log 305A depicted in FIG. 15 additionally includes field 1014 and causes field 1012 to additionally include field 1012c. Field 1014 stores date and time information indicating the date and time of execution of an operation (the backup operation in the example of FIG. 15). Field 1012 stores an offset table that includes position information indicating the position, in a backup file, of the operation source data on which the backup operation has been performed.

FIG. 16 is a diagram illustrating an example of the offset table stored in the operation log. The offset table 10310 depicted in FIG. 16 includes fields 10311 to 10313. Field 10311 stores a data name for identifying data. Field 10312 stores offset information indicating an offset of data in a backup file. Field 10313 stores length information indicating the data length of the data in the backup file. The offset information and the length information are position information indicating the position of data in the backup file.

Figure 17:
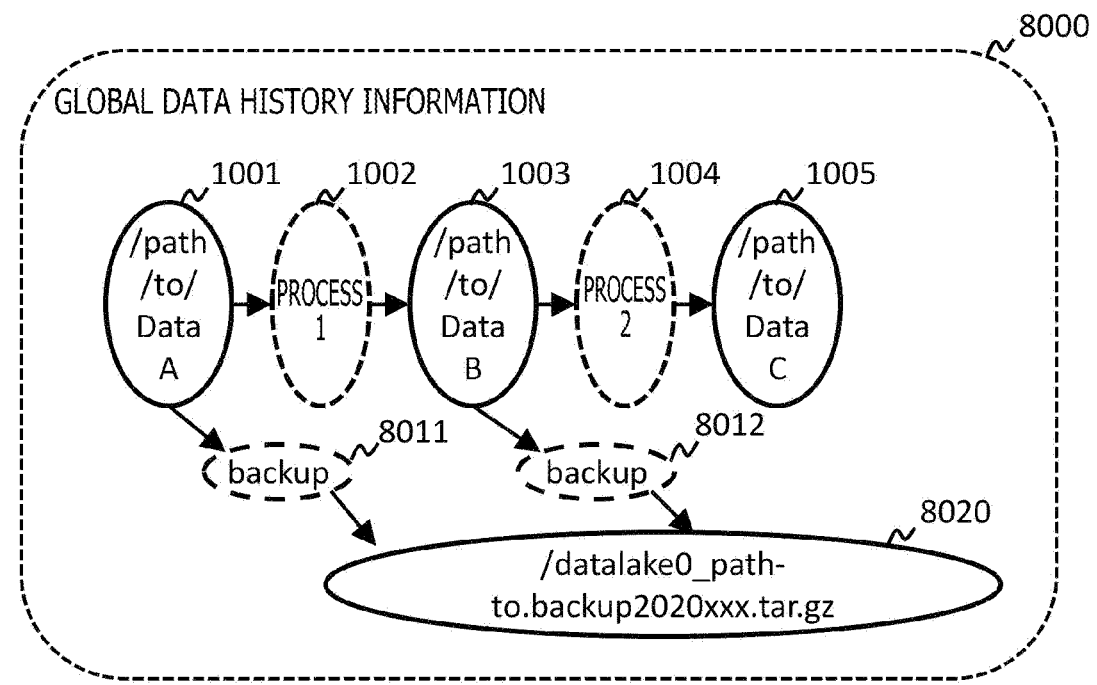
FIG. 17 is a diagram illustrating another example of the global data history information.

FIG. 17 is a diagram illustrating an example of the global data history information according to the second embodiment. The global data history information 8000 depicted in FIG. 17 is an example of global data history information that is obtained by combining the data history information 303A depicted in FIG. 14 with the operation log 305A depicted in FIG. 15.

The global data history information depicted in FIG. 17 is created by the data deletion program 306 as described with reference to steps S6005 and S6006 of FIG. 9, which relates to the first embodiment. More specifically, on the basis of the date and time information stored in field 1014 of the operation log 305A and of the operation source information stored in field 1012, the data deletion program 306 identifies, as the backup operation source data, data included in a directory in a backup target path stored in field 1012b and existing at an execution date and time indicated by the date and time information, and creates the global data history information 8000 by performing the backup operation to combine all sets of the backup operation source data and place the combined backup operation source data in the backup file.

As depicted in FIGS. 14 and 15, the data in the "/path/to/" directory existing at site A at the execution date and time indicated by the date and time information stored in field 1014 of the operation log 305A is data 1001 and 1003. Therefore, in the global data history information 8000 depicted in FIG. 17, data 1001 and 1003 are combined with a backup file 8020 respectively by backup operations 8011 and 8012. It should be noted that data 1005 is also included in the "/path/to/" directory. However, data 1005 did not exist in the "/path/to/" directory at the execution date and time. Therefore, data 1005 is not combined with the backup file 8020.

FIG. 18 is a diagram illustrating an example of the deletion list according to the second embodiment. The deletion list 8030 depicted in FIG. 18 is a deletion list that is created in a case where the data deletion program 306 at site A receives, from the global data history information 8000 depicted in FIG. 17, the derivative deletion instruction designating data 1003 as the deletion-specified data. The deletion list 8030 indicates, as the deletion target data, data B and C at site A and data B in a backup file (site0_path-to.backup20200103.tar.gz) at site Z. Further, offset information (offset:bbb) and length information (Length:lenb), which are position information, are added to the deletion list 8030 in step S5010 of FIG. 7.

Moreover, in step S7005 of FIG. 12, the data deletion program 306 deletes the deletion target data, according to the position information included in the deletion list 8030, by partially deleting or partially encrypting a portion of the backup file that corresponds to the deletion target data. Partial encryption is performed to turn the deletion target data into an unrecoverable bit string, for example, by rewriting the portion corresponding to the deletion target data into a predetermined bit pattern (e.g., a bit pattern of all 0s or all 1s).

Figure 19:
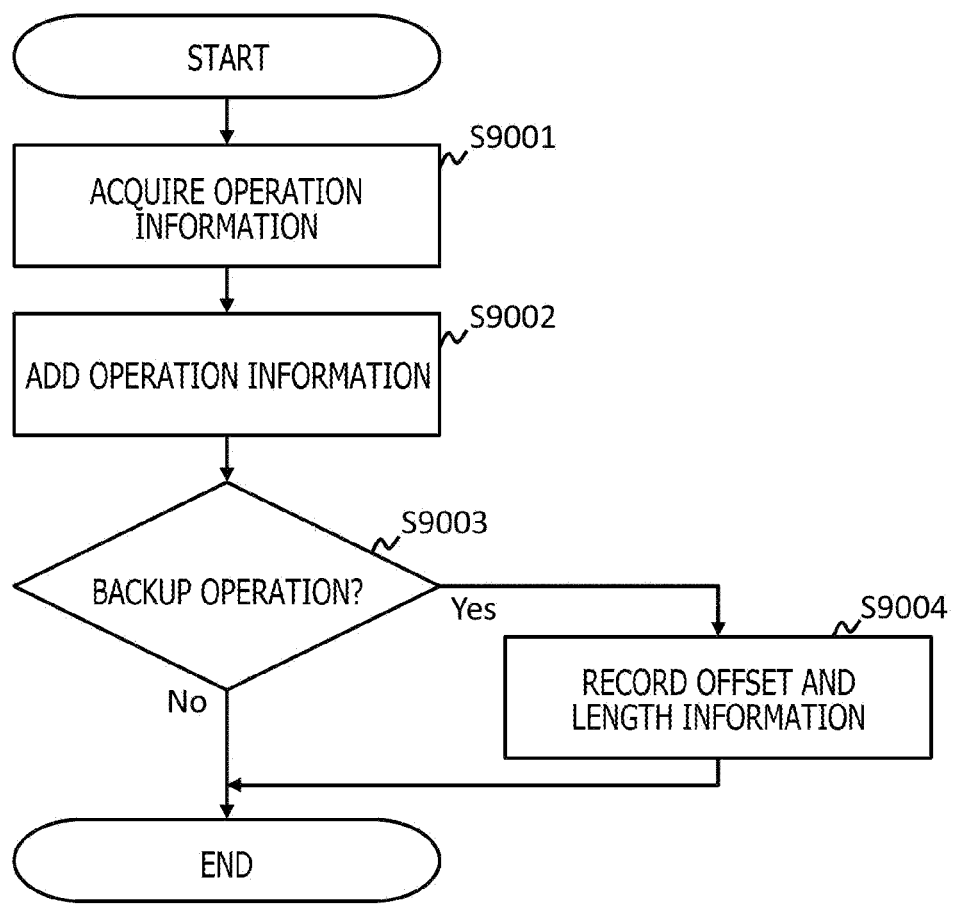
FIG. 19 is a flowchart illustrating an example of a log update process.

FIG. 19 is a flowchart illustrating an example of a log update process for updating the operation log when the backup operation is executed.

In the log update process, the data management program 304 acquires the operation information regarding an operation executed by the data processing program 301 (step S9001), and adds the acquired operation information to the operation log (step S9002). The operation information includes, for example, the operation name, the information regarding the file name, source site name, and source path of the operation source data, and the information regarding the file name, destination site name, and destination path of the operation destination data.

The data management program 304 determines whether the operation executed by the data processing program 301 is the backup operation (step S9003).

In a case where the operation is not the backup operation ("No" at step S9003), the data management program 304 terminates the log update process. Meanwhile, in a case where the operation is the backup operation ("Yes" at step S9003), the data management program 304 acquires information regarding the offset and length of each set of data in the backup file, and adds the acquired information to the operation log as metadata information 10310 (step S9004). Upon completion of step S9004, the data management program 304 terminates the log update process.

According to the present embodiment, which has been described above, the operation log 305 of the backup operation includes the offset table 10310, which indicates the position of each set of data in the backup file. On the basis of the offset table 10310, the CPU 202 deletes the deletion derivative data by partially deleting or partially encrypting a portion of the backup file that corresponds to the deletion target data. Therefore, the deletion derivative data can be properly deleted even in a case where the deletion derivative data is included in the backup file that contains a plurality of sets of data.

Further, according to the present embodiment, the data history information 303 and the operation log 305 includes date and time information indicating the date and time of data processing and operation execution. The operation log 305 of the backup operation includes path information indicating the directory targeted for backup operation. On the basis of the date and time information and of the path information, the CPU 202 identifies the deletion derivative data that has been derived from the deletion-specified data when a backup process has been performed.

The above-described embodiments of the present disclosure are illustrative and not restrictive of the present disclosure. It should be understood that the scope of the present disclosure is not limited to the above-described embodiments. Persons of skill in the art will appreciate that the present disclosure may be implemented in various other embodiments without departing from the scope of the present disclosure.

For example, the storage device 204 for storing data may be disposed outside of and shared by a plurality of nodes.

What is claimed is:

1. A storage system comprising:
   a plurality of nodes each including a processor and a memory for storing data; and
   a plurality of sites each have a node of the plurality of nodes, wherein
   the processor
      executes a creation process of creating data based on data stored in the memory and storing the created data in the memory of the node at one of the plurality of sites, and the creation process includes a data process and an operation process,
      executes a data process of creating processed data by processing data stored in the memory and storing the processed data in the memory at a local site,
      executes the operation process of creating duplicate data identical with the data stored in the memory and storing the created duplicate data in the memory at a remote site, and the operation process includes a backup process of creating, as the duplicate data, a backup file containing at least one of a plurality of sets of data included in a specified directory and stored in the memory, creates, for each of the plurality of sites, history information indicating history of each creation process performed at each of the plurality of sites includes date and time information indicating the date and time of execution of the creation process, and the history information regarding the backup process includes position information indicating a position of each of the plurality of sets of data in the backup file and path information indicating the specified directory, collects the history information from each of the plurality of sites, when deleting deletion-specified data, identifies deletion derivative data, according to the history information created at each of the plurality of sites, and deletes the deletion-specified data and the deletion derivative data from the memory at each of the plurality of sites, the deletion derivative data being derivative data derived from the deletion-specified data, deletes on a basis of the position information, the deletion derivative data by deleting or encrypting a portion of the backup file, the portion corresponding to the deletion derivative data, and when the backup process is performed, identifies, on a basis of the path information and the date and time information, the deletion derivative data derived from the deletion-specified data.

2. The storage system according to claim 1, wherein, when the deletion derivative data is determined on a basis of the history information to be stored at a remote site, the processor deletes the deletion derivative data by requesting the node at the remote site to delete the deletion derivative data.

3. The storage system according to claim 1, wherein the processor creates global history information according to the history information collected from each of the plurality of sites, and identifies the deletion derivative data according to the global history information, the global history information indicating derivative relation between data stored in the storage system.

4. The storage system according to claim 1, wherein the backup file is a compressed file.

5. A data deletion method used by a storage system including a plurality of nodes distributed to a plurality of sites, the plurality of sites each including a node of the plurality of nodes, and each of the plurality of nodes includes a processor and a memory for storing data, the data deletion method causing each of the plurality of nodes to perform the steps of:

executing a creation process of creating data based on data stored in the memory and storing the created data in the node at one of the plurality of sites, and the creation process includes a data process and an operation process;

executing a data process of creating processed data by processing data stored in the memory and storing the processed data in the memory at a local site;

executing the operation process of creating duplicate data identical with the data stored in the memory and storing the created duplicate data in the memory at a remote site, and the operation process includes a backup process of creating, as the duplicate data, a backup file containing at least one of a plurality of sets of data included in a specified directory and stored in the memory;

creating, for each of the plurality of sites, history information indicating history of each creation process performed at each of the plurality of sites includes date and time information indicating the date and time of execution of the creation process, and the history information regarding the backup process includes position information indicating a position of each of the plurality of sets of data in the backup file and path information indicating the specified directory;

collecting the history information from each of the plurality of sites;

when deleting deletion-specified data, identifying deletion derivative data according to the history information created at each of the plurality of sites, and deleting the deletion-specified data and the deletion derivative data from each of the plurality of sites, the deletion derivative data being derivative data derived from the deletion-specified data;

deletes on a basis of the position information, the deletion derivative data by deleting or encrypting a portion of the backup file, the portion corresponding to the deletion derivative data; and when the backup process is performed, identifies, on a basis of the path information and the date and time information, the deletion derivative data derived from the deletion-specified data.

* * * * *